Figure 1:
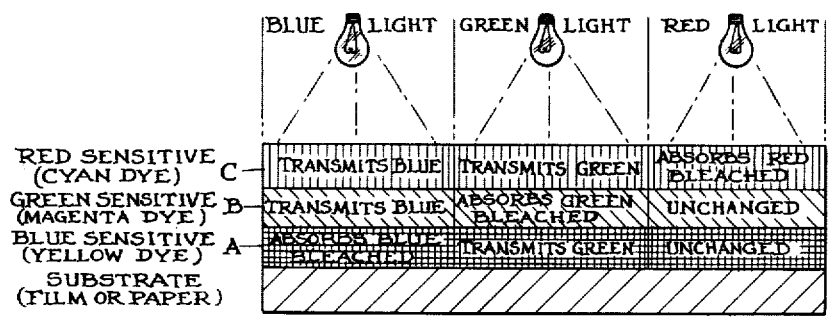

Sept. 24, 1963  R. H. SPRAGUE ETAL  3,104,973
PHOTOGRAPHIC BLEACHING OUT OF CYAINE DYES
Filed Aug. 5, 1960

INVENTORS
ROBERT H. SPRAGUE
HARRY L. FICHTER, Jr.
WILLIAM P. HAMILTON
BY Lawrence J. Field
ATTORNEY _United_ States Patent Office 3,104,973
Patented Sept. 24, 1963

1

3,104,973
PHOTOGRAPHIC BLEACHING OUT OF CYANINE DYES
Robert H. Sprague, Cleveland, Harry L. Fichter, Jr., Lakewood, and William P. Hamilton, Cleveland, Ohio, assignors to Horizons Incorporated, Cleveland, Ohio, a corporation of New Jersey
Filed Aug. 5, 1960, Ser. No. 47,849
19 Claims. (Cl. 96—48)

This invention relates to a direct positive photographic process. More particularly, the invention relates to a non-silver direct positive dye-bleach photographic process capable of producing full color photographic prints wherein the dyes comprising the final image are intense, sharp cutting and brilliant colors, yielding a very high quality color rendition.

The photo system of this invention is one of extreme simplicity in which the essential elements are: (1) a light sensitive material which bleaches out when exposed to light of a suitable wavelength and (2) a sensitizing agent which markedly accelerates the aforesaid bleaching-out. Preferably the system also includes a suitable base in which the light sensitive material and the sensitizer are dispersed or on which they may be supported. In the photo system of the present invention direct positive prints of high quality are produced solely by the action of the exposing light without any chemical developing such as that which characterizes conventional photo systems based on silver compounds.

As indicated above in its simplest form the photosensitive system of this invention comprises a light sensitive material and a sensitizing agent. To perform specific functions or to produce specific benefits, other materials may be added to the two essential constituents. For instance a film-forming plastic or resin may serve as the support wherein the sensitizer and light sensitive material are dispersed, or a filler may be added to provide a background of any desired tint or opacity.

The light sensitive materials suitable for the process are the cyanine dyes and the present use is not to be confused with their already well known use in the photographic art for the optical sensitization of silver halide emulsions, e.g. as described in Dieterle 2,148,979; Brooker et al. 2,231,658; Brooker et al. 2,398,999 and many other similar patents. In general all classes of cyanines may be used such as simple cyanines, carbocyanines, dicarbocyanines, tricarbocyanines, or other polycarbocyanines, pyrrolocyanines, hemicyanines, styryl dyes as hereinafter defined and the like. Cyanine dyes are derived from quaternary salts of heterocyclic bases by already known condensation reactions. Suitable bases having 5 or 6 membered heterocyclic nuclei which may be used in the preparation of cyanine dyes for the present invention include the following:

Thiazole
Oxazole
Selenazole
Imidazole
Benzothiazole
Benzoselenazole
Benzimidazole
Naphthothiazole
Naphthaoxazole
Thiazoline and others of a similar nature.

Cyanine dyes are known in virtually every color of the visible spectrum but they are fugitive to light and hence are regarded as useless for many purposes. However, the loss of color usually proceeds at a relatively slow rate and it is often months before the dye is bleached out on exposure to sunlight or ordinary visible light.

Occasional efforts have been made in the past to accelerate the bleachout of the cyanine dye, e.g. by the use of a sensitizer as described in Rust et al. 2,054,390, but the interval required for bleachout has not heretofore been diminished sufficiently to permit any practical use to be made of the bleachout of the cyanine dyes.

One object of this invention is to provide a non-silver direct positive dye-bleach photographic system capable of producing full color photographic prints. Another object of this invention is to provide a photo system for producing single color prints of intense and brilliant color.

Still another object of the invention is to provide a relatively simple photo system wherein full color direct positive prints are produced solely by the action of the exposing light without any chemical development.

Still another object of the invention is to provide a process wherein the colored image produced may be stabilized and fixed by a simple heat treatment.

A still further object of this invention is to provide a process for producing positive transparencies in full color, either for projection or for color prints when coated on a white opaque substrate.

A still further object of the invention is to provide a simple photo system for the production of office copy.

Figure 2:
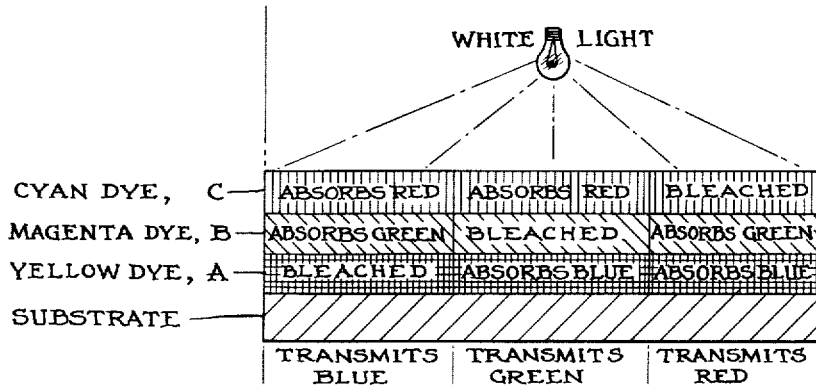

These and other objects are achieved by utilizing the present photographic system in any of the several alternative modes of practicing the invention described below and illustrated in the accompanying drawings in which:

FIGURE 1 diagrammatically illustrates the effect of exposure of a tripack to light of various colors, and FIGURE 2 schematically shows the effect of projecting white light through the resulting direct positive obtained after the exposure of FIGURE 1.

A direct positive full color print may be obtained by utilization of an integral tripack of three sensitive layers. Each layer comprises a sensitive coating containing a dye of the proper color mixed with a suitable activating agent and dispersed in a convenient film-former. Any of the layers may also include extraneous materials added for specific purposes, e.g. to alter the speed of the system. When the sensitive coating is exposed image-wise to light of the wavelength absorbed by the dye, the dye is bleached in the area struck by the light, with the result that a direct-positive image remains in the layer. By proper selection of the dyes an accurate color rendition is obtained by a subtractive process.

For example, a green sensitive layer may be obtained with our process, using a magenta dye, which is, of course, green absorbing, transmitting blue and red freely. When such a film is exposed in a camera, for example, to light reflected from colored objects, the action of green light on this layer is to bleach the magenta dye. It is not, of course, affected by blue or red light; light of these wavelengths is not absorbed by the sensitive material. What is obtained in this layer, therefore, is a minus-green record which corresponds, for example, with the magenta printer in conventional color printing processes.

Similarly, a blue-sensitive layer, comprising a yellow dye, is bleached on exposure to blue light, giving a minus-blue record which corresponds to the yellow printer in conventional printing processes.

Finally, a red-sensitive layer, containing a cyan dye, is bleached by red light, giving a minus-red image corresponding to the cyan printer in color printing processes.

When these three sensitive layers are superimposed in an integral tripack it will be seen that, since all three of the dyes transmit freely in the areas in which they do not absorb, light of a particular color will affect only a single layer. The result of the subtractive reflection of light from a white, opaque substrate on such exposed layers is the reflection of light of the same color as that originally exposing the material.

This may be further illustrated by reference to FIGURE 1.

The three-layer integral tripack, depicted in FIGURE 1, consists of three light-sensitive layers superimposed, one on top of the other. The coating nearest the substrate is a blue-sensitive yellow dye labelled "A," the coating on top of this is a green-sensitive magenta dye labelled "B," and the topmost coating is a red-sensitive cyan dye labelled "C."

The effect of light of the primary colors, blue, green and red, on such a coating is illustrated by the diagram under the areas marked "Blue Light," "Green Light," and "Red Light." Since the red-sensitive layer, "C," and the green-sensitive layer, "B," transmit blue light freely, no effect is obtained with blue light until layer "A" is reached; whereupon the yellow dye is bleached in this area. Therefore, in the area of the film struck by blue light, there remain the cyan layer and the magenta layer. After fixing, which may be accomplished by short heating, if such an exposed film is viewed under white light, the cyan layer will absorb red light; the magenta layer will absorb green light; while both the cyan layer and magenta layer will transmit blue freely, as shown in FIGURE 2.

In this way, the result is reflection or transmission of only blue in the area which was originally struck by blue light; in other words, a direct positive is obtained. Similarly, when green light strikes the three-layer coating, the cyan dye will transmit the green freely while the magenta dye will absorb the green light and be bleached. Since the cyan dye and the yellow dye are still intact and the former will absorb red while the latter will absorb blue, the net reflection or transmission from the bleached layer will be green; again, a direct positive. Finally, in the area struck by red light, the cyan dye will absorb this radiation and be bleached. The green- and blue-sensitive layers will be unaffected. The magenta dye will absorb the green light, the yellow dye will absorb the blue light, and the net reflection from the combined three layers will be red.

Our novel direct-positive photo process is thus useful for providing positive transparencies for projection when coated on a clear film base or for color prints when coated on a white opaque substrate.

We are aware that dye-bleach photographic processes are known in the art, such as those described in United States Patent 1,985,344, issued to Bela Gasper et al. However, these processes are based on the light sensitivity of a silver halide emulsion, the colored images resulting from selective bleaching of dyes present in the emulsion. This is achieved by the catalytic effect of the chemical bleaching of the silver halide following exposure to light and development of the negative image. Such dye-bleach processes are subject to all the limitations in complicated developing procedures inherent in the other color processes dependent upon silver halide emulsions.

The dye-bleach photographic process of the present invention, by virtue of its extreme simplicity and absence of wet-development procedures, is thus a marked improvement over the earlier art.

As indicated above, the dyes used in our photographic process belong to the class known as cyanines, which have been used for many years in conventional silver halide emulsions as optical sensitizers, i.e. to sensitize the emulsion to visible light. We have found that when such dyes are mixed with a suitable organic halogen-containing compound such as, for example, carbon tetrabromide and coated on a suitable substrate in a convenient binder such as nitrocellulose solution the resulting coating is sensitive to light corresponding to the wavelength absorbed by the dye; and the effect of absorption of light in the visible region is to bring about bleaching of the dye in the light-sensitive coating.

Although we do not wish to be bound to any specific theory, it appears that a complex may be formed between the carbon tetrabromide, for example, and the cyanine dye which requires less energy to raise it to an excited state to permit the desired photolytic reaction to take place than when such complexes do not form.

In our copending application, Serial No. 42,233, filed July 12, 1960, we describe a further class of weakly colored styryl dye bases and their vinylene homologs which are capable of producing intense colors of high brilliance when utilized as a photo system in combination with suitable organic halogen-containing compounds. The effect of exposure to light of coatings containing the styryl-base type compounds and the organic halogen-containing derivatives is to produce a negative/positive image in which the originally weakly colored dye base is converted to an intense deeply colored dye image.

In contrast with our previous aforementioned application, the dyes of the present invention when a suitable organic halogen compound is present, are bleached when exposed to light, giving as described above a direct positive image. Furthermore, the bleach-out process of this present invention requires no solvent extraction for fixation to render the dye image permanent; a short heating period only is needed to destroy any sensitivity remaining in the system after exposure to visible light.

In addition to its application to color photography, our novel photosensitive system may be used as an office photocopy material. Thus, for example, compositions comprising a suitable halogen-containing organic compound and a mixture of light sensitive cyanine dyes, in such proportions that a neutral gray-black color is produced, may be used in a suitable exposing device to give a direct positive copy of printed material. Such a system has the advantage that no wet processing is required to develop the image and, furthermore, being sensitive to light of all colors makes it possible to copy colored signatures or colored printing. Furthermore, a three-layer coating material such as that shown in FIGURE 1 may be used to copy colored engineering drawings, for instance, in color. We have found that not only can our light-sensitive photocopy material be exposed by normal exposing techniques, such as those used in photographic printing, but it may also be used as a reflex copy material in which the exposure is made through the back of the photosensitive sheet. This has the advantage that it permits the copying of material which has been printed on both sides of the sheet.

In general terms, therefore, our novel photosensitive system is utilized in a variety of ways. If it is desired to produce a single color, direct positive image, as a result of the bleach-out reaction in the visible, a cyanine dye is chosen having absorption characteristics compatible with the source of light available in the visible. This is combined with a suitable organic halogen-containing compound and the combination is dispersed and coated on a suitable substrate. After exposure to light of the appropriate color, either in a camera or through an appropriate image-forming copy, an image of intense brilliance is obtained, the unexposed portions remaining the original color. By utilizing three superimposed color-sensitive layers, as previously described, a full-color reproduction of the original may be obtained. Finally, if the mixture of dyes is coated to give a neutral density on the photosensitive sheet, direct positive photocopy materials may be prepared, using our new photosensitive system capable of copying colored subjects either in monochrome or full color, and which may be exposed by reflex techniques if desired.

As described above, the cyanine dyes useful for the purposes of our invention are of diverse types well-known to those skilled in the art of optical sensitization of silver halide emulsions. In general, all classes of cyanines are useful. Cyanine dyes are derived from quaternary salts of heterocyclic bases by condensation reactions well-known to those skilled in the art. Types of heterocyclic bases having an active methyl group and which may be utilized in such condensation reactions include the following:

2-methylbenzothiazole
2-methylbenzoxazole
2-methylbenzimidazole
2-methylthiazoline
Quinaldine
Lepidine
1-methylisoquinoline
2-methyl-α-naphthothiazole
2,4-dimethylselenazole
2-methylbenzoselenazole
2,4-dimethyloxazole
2-methyl-α-naphthoxazole
2-methyl-β-naphthoxazole
2-methyl-4,5,6,7-tetrahydrobenzothiazole
2-methyl-4,5,6,7-tetrahydrobenzoxazole
2-methyl-5-6-7-8-tetrahydro-4-cycloheptathiazole
2-methyl-5,6-dihydro-4-cyclopentathiazole
2-methyl-6,7-dihydro-4-H-pyrano(4,3D)thiazole
2-methyl-6,7-dihydro-4-H-thiopyrano(4,3D)thiazole
2-methyl-5,6-dihydro-4-H-pyrano(3,2D)thiazole
2-methyl-β-naphthothiazole
Alpha-picoline
Gamma-picoline
3-methylisoquinoline
2,4-dimethylthiazole
2-methyl-4-phenylthiazole
2-methylthiazole
2,3,3-trimethylindolenine Cyanine dyes prepared by such condensation reactions and useful in the present invention may also be represented by the following general formulas:

I. Symmetrical and unsymmetrical cyanines

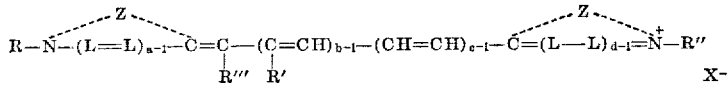

wherein
R is alkyl or aralkyl,
R' is alkyl or aralkyl,
R" is alkyl or aralkyl,
R''' is hydrogen or C≡N, and each of R, R' and R" may either be unsubstituted or substituted.
L represents a methine group,
X represents a monovalent acid radical,
Z and Z' represent the nonmetallic atoms necessary to complete a heterocyclic nucleus containing from 5 to 6 atoms in a heterocyclic ring such as those listed earlier in this specification (thiazole, oxazole, etc.),
a represents a positive integer, either 1 or 2,
b represents a positive integer, either 1 or 2,
c represents a positive integer from 1 to 4, and
d represents a positive integer, either 1 or 2.

One member of this group, having the Formula A and the chemical name 3,3'-diethylthiacarbocyanine-p-toluene sulfonate is considered typical of this class.

(A)

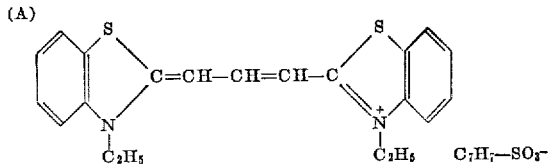

II. Symmetrical pyrrolocyanines

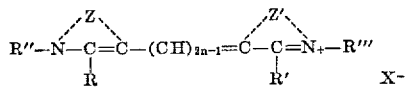

in which Z and Z' each represent the nonmetallic atoms necessary to complete a pyrrole, indole or pyrrocoline nucleus, and may be the same or different; R and R' each represent hydrogen, alkyl or a chemical bond in a pyridine ring and may be the same or different; R" and R''' each represent hydrogen, alkyl, arylalkyl or a chemical bond of the same pyridine ring as R or R' and may be the same or different; n represents a positive integer of from 1 to 2; and X represents an acid radical.

One member of this group having the Formula B and the chemical name 2,2',5,5'-tetramethyl-1,1'-diphenyl-3,3'-pyrrolocyanine chloride is considered typical of the pyrrolocyanine class.

(B)

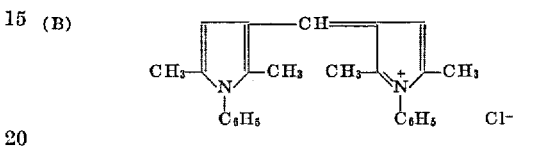

III. Unsymmetrical pyrrolocyanines

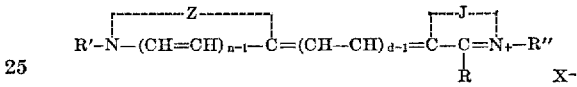

in which Z represents the nonmetallic atoms necessary to complete a 5 or 6 membered heterocyclic nucleus, as described above; J represents the nonmetallic atoms necessary to complete a pyrrole nucleus; R represents hydrogen, alkyl or a chemical bond in a pyridine ring; R' represents alkyl; R" represents hydrogen, alkyl, aryl or a chemical bond of the same pyridine ring as R; d represents a positive integer of from 2 to 3; n represents a positive integer of from 1 to 2; and X represents an acid radical.

One member of this group having the Formula C and the chemical name 3-ethyl-2',5'-dimethyl-1'-phenyloxa-3'-pyrrolocarbocyanine-p-toluene sulfonate is considered typical of the unsymmetrical pyrrolocyanine class.

(C)

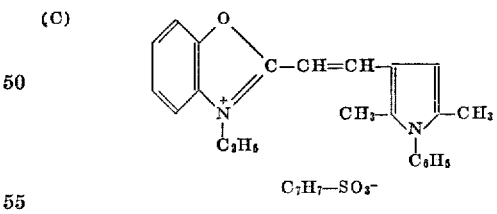

IV. Hemicyanines

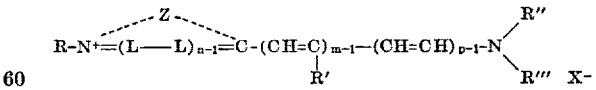

in which R and R' each represent members selected from the group consisting of hydrogen, alkyl and aralkyl groups and may be the same or different; R" and R''' each represent members selected from the group consisting of alkyl, aralkyl or aryl groups, or each may represent a bond in the same heterocyclic ring; m represents a positive integer from 1 to 2; n represents a positive integer from 1 to 2; p represents a positive integer from 1 to 3; L represents a methine group; X represents an acid radical; and Z represents the nonmetalilc atoms necessary to complete a heterocyclic nucleus containing from 5 to 6 atoms in the heterocyclic ring.

One member of this group having the Formula D and the chemical name 2-(2-piperidylvinyl)quinoline-methop-toluene sulfonate is considered typical of the hemicyanine class.

(D)

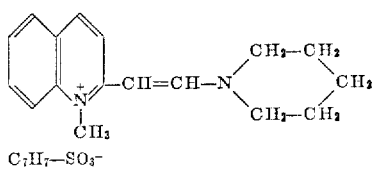

$C_7H_7-SO_3^-$

V. Styryl dyes and vinylene homologs thereof

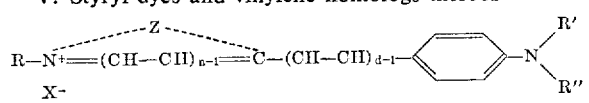

where Z represents the nonmetallic atoms necessary to complete a heterocyclic nucleus containing from 5 to 6 atoms in a heterocyclic ring such as those listed earlier in this specification (thiazole, oxazole, etc.); $n$ represents a positive integer of from 1 to 2; R, R', and R" each represents a member selected from the group consisting of alkyl or aralkyl groups; $d$ represents a positive integer from 2 to 4; and X represents an acid radical.

One member of this group, having the Formula E and the chemical name 2-p-dimethylaminostyrylquinoline metho-p-toluene sulfonate, is considered typical of the styryl dye class.

(E)

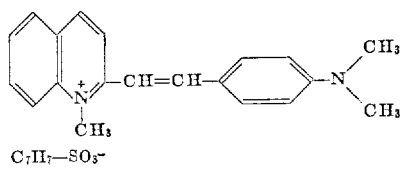

$C_7H_7-SO_3^-$

Another member of this class, having the Formula F and the chemical name 4-(4-p-dimethylaminophenyl-1,3-butadienyl)-quinoline metho-p-toluene sulfonate, is considered typical of the higher vinylene homologs of the styryl dyes.

(F)

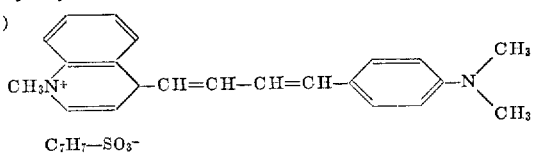

$C_7H_7-SO_3^-$

Organic halogen-containing compounds which have been found to accelerate the bleach-out of cyanine dyes in the photo system of the present invention appear to be characterized by the presence of at least three halogen atoms on a single carbon atom. Preferably the halogen is bromine.

Organic halogen-containing compounds which have been found to be useful for the purposes of our invention include the following:

Pentabromoethane
Carbon tetrabromide
Hexabromoethane
Hexachloroethane
p-Nitrobenzotribromide
Carbon tetraiodide
Benzotribromide
Iodoform
1,1,1-tribromo-2-methyl-2-propanol
2,2,2-tribromoethanol
α,α,α,α',α',α'-Hexachloro-p-xylene
α,α,α,α',α',α'-Hexachloro-m-xylene
1,1,1-trichloro-2-methyl-2-propanol
α,α,α-Trichlorotoluene Each of the above compounds is an organic halogen containing compound which is normally solid at room temperature and which may be represented by the following general formula $$A-C-X_3$$

wherein A represents a monovalent radical selected from the group consisting of H, Br, Cl, I, alkyl and aryl and each X represents a halogen selected from the group consisting of chlorine, bromine and iodine.

In the examples which follow, the proportions of sensitizer to bleach-out dye illustrated, range from approximately equal parts by weight up to 80 parts of sensitizer for each part of bleach-out dye, but it is to be understood that between about 1 and 10,000 parts by weight of the bleach-out accelerator may be present for each part of bleach-out dye, by weight.

Suitable organic binder solutions which have been found to be useful for the purposes of our invention include the following:

Nitrocellulose in alcohol
Polyvinyl chloride in tetrahydrofuran
Polystyrene in benzene
Polyvinylchloride - polyvinylidenechloride copolymer (Saran) in methyl ethyl ketone
Ethyl cellulose in alcohol It will be evident that many other compatible and inert binders may be substituted for those listed above, including a wide variety based on polymers of vinylidene and/or vinyl monomers, copolymers of vinyl and/or vinylidene monomers, mixtures of said polymers and/or copolymers as well as those based on other cellulose derivatives than those listed by way of illustration. As indicated in the examples which follow, the specific vehicle or carrier for the cyanine dye and the organic halogen compound does not appear to constitute a critical aspect of the invention since it appears that this constituent merely serves as a support whereby the two active ingredients are maintained in intimate physical association.

The following examples are indicative of specific methods of practice of preferred embodiments of our invention and are to be considered as illustrative rather than as limitative:

*Example 1*

A solution containing 10 grams nitrocellulose, 50 cc. acetone, 50 cc. methanol, 0.2 gram yellow dye (3,3'-diethyl-4'-methyloxathiazolocarbocyanine iodide), and 16 grams carbon tetrabromide was applied as a thin layer to a standard .005-inch cellulose acetate clear film and permitted to dry thereon. After drying, a coating was superimposed thereon consisting of a solution of 0.2 gram magenta dye (1'-3-dimethyloxa-2'-carbocyanine-p - toluene sulfonate) and 16 grams carbon tetrabromide in 100 cc. of a 10% nitrocellulose solution in equal parts by volume of acetone and methanol. Finally, a third sensitized layer was applied by coating a solution consisting of 0.4 gram cyan dye (1,1'-dimethyl-2,2'-dicarbocyanine-p-toluene sulfonate) and 16 grams carbon tetrabromide in a similar 10% nitrocellulose solution on top of the previous two layers, thereby forming an integral tripack of the type shown in FIGURE 1.

The resultant sensitized film, after drying, was exposed in four sections at a distance of 10 inches to a 375-watt reflector type photoflood lamp as follows: the first area, through a Kodak Wratten No. 49 (blue) filter; the second area, through a No. 61 (green) filter; the third area, through a No. 29 (red) filter; and finally, the remaining area was exposed directly to the normal white radiation of the lamp.

After two-minutes exposure a picture was obtained which was a satisfactory copy of the subject, i.e. the color of each section duplicated the original color to which it was exposed.

*Example 2*

In place of the cellulose acetate film used in Example 1 (above), a sheet of paper was coated in a like manner to support three sensitized layers. The resulting sensitized sheet, when exposed to a photoflood lamp through a colored film subject was found to produce a satisfactory copy, duplicating the colors of the subject.

By this method it is likewise practicable to make copies in color of a wide range of subjects such as, for instance, multicolored engineering drawings on tracing paper.

Example 3

A solution of 0.5 gram cyan dye (1,1'-dimethyl-4,4'-carbocyanine-p-toluene sulfonate), 0.3 gram magenta dye (3,3'-diethylthiacarbocyanine iodide), 0.4 gram yellow dye (3-ethyl-2',5'-dimethyl-1'-phenyloxa-3'-pyrrolocarbocyanine iodide), 15 grams hexachloroethane, in 40 cc. methanol and 60 cc. acetone was coated on paper to give a neutral, deep gray-to-black colored sheet. This sensitized sheet when exposed in a diazotype printing machine under a typewritten sheet on translucent paper gave an exact, positive, black-and-white copy of the original subject without requiring the customary ammonia or moist development required to produce a dye image as on ordinary diazotype papers. A short exposure of the finished print to an infrared lamp produced a permanently fixed copy, no longer sensitive to light.

Example 4

A solution of 0.5 gram magenta dye (1'-3-dimethyl-oxa - 2' - carbocyanine - p - toluene sulfonate) and 16 grams of carbon tetrabromide in 75 cc. methanol and 25 cc. acetone was coated on paper to give an intensely dark, magenta-colored sheet. Exposing this sheet under a suitable subject in an Ozalid printing machine produced a brilliant, deeply colored, direct positive copy of the original without requiring the usual ammonia or wet development. The heating during the exposure was found to be sufficient to permanently fix the print thus produced.

Example 5

A mixture of 0.3 gram cyan dye (1,1'-dimethyl-2,2'-dicarbocyanine-p-toluene sulfonate) and 0.4 gram magenta dye (1'-3-dimethyloxa-2'-carbocyanine-p-toluene sulfonate) together with 10 grams hexachloroethane, dissolved in 60 cc. methanol and 40 cc. acetone, was coated on paper and found to give an intensely colored, dark purple sheet. Exposing this sensitized sheet under a line drawing on translucent paper to a General Electric 275-watt sunlamp at a distance of 10 inches produced a high contrast, dark purple-on-white direct positive copy of the original subject in approximately 30 seconds. Fixing was accomplished by exposure for a short time to an infrared lamp.

In order to make a copy from an opaque subject, or one with printing on both sides, it is possible to make "reflex" exposures, that is, expose to light through the back of the sensitized sheet, the face of which is in contact with the subject to be copied. When making reflex copies of translucent subjects, it is advisable to place behind the subject a sheet of white reflecting material such as white bond paper.

Example 6

A solution of 0.5 gram cyan dye (1,1'-dimethyl-4,4'-carbocyanine-p-toluene sulfonate), 0.3 gram magenta dye (3,3'-diethylthiacarbocyanine iodide), 0.4 gram yellow dye [2-(2-piperidinovinyl)quinoline metho-p-toluene sulfonate], 10 grams carbon tetrabromide, in 40 cc. methanol and 60 cc. acetone, was coated on paper to give a neutral, deep gray-to-black colored sheet. This sensitized sheet when exposed in a diazotype printing machine under a typewritten sheet on translucent paper gave an exact, positive, black-and-white copy of the original.

Example 7

A solution containing 0.25 gram of 4-dimethylaminostyrylquinoline metho-p-toluene sulfonate, dissolved in a mixture of 20 cc. methanol, 22 cc. acetone, and 20 cc. dimethyl formamide, together with 10 grams $CBr_4$ was applied to a sheet of 9-pound onionskin paper. After drying, the resultant magenta sheet was exposed by reflex-printing techniques in a photographic printing box to a suitable opaque subject, the light first passing through the sensitized layer and being reflected from the copy sheet. The resulting print, when separated from the subject and viewed through the back of the sheet, was an exact right-reading copy of the subject. No further fixing was necessary, the heating incidental to the exposure being sufficient to dispel the residual $CBr_4$ from the sheet and render the material insensitive to further exposure to light.

Substituting 4 - [4 - (p - dimethylaminophenyl)butadienyl]quinoline methyl-p-toluene-sulfonate for the dye in the preceding paragraph gave a similar reflex copy of good legibility, but with a deep-blue image in place of the purplish shades of the original sample.

We claim:

We claim:

1. A photosensitive composition which is an intimate admixture consisting essentially of a cyanine dye which bleaches out on exposure to suitable radiation and a normally solid organic halogen-containing compound which accelerates the bleaching out of said cyanine dye on said exposure, the organic compound being one having at least three halogen atoms on a single carbon atom, and represented by the general formula A—C—$X_3$ wherein A represents a member selected from the group consisting of H, Br, Cl, I, alkyl and aryl, and each X represents a halogen selected from the group consisting of Cl, Br and I; the organic halogen compound being present in said composition from about equal parts by weight of organic halogen compound and cyanine dye up to 10,000 parts by weight of organic halogen compound for each part by weight of cyanine dye.

2. The photosensitive composition of claim 1 wherein the cyanine dye is represented by a general formula selected from the group consisting of

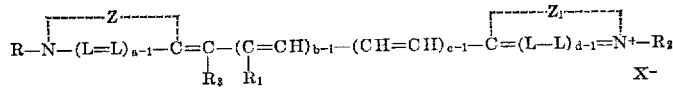

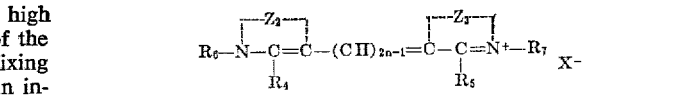

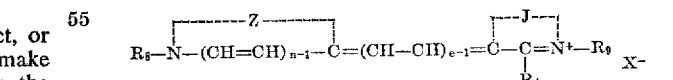

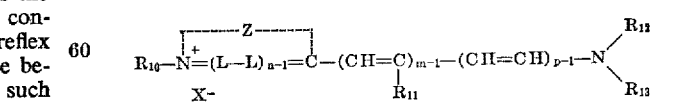

and

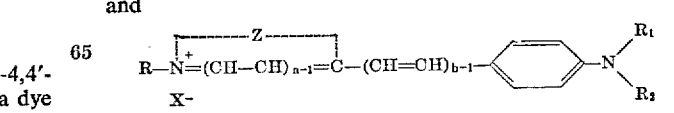

wherein each R, $R_1$, $R_2$ is selected from the group consisting of alkyl and aralkyl;

$R_3$ is selected from the group consisting of —H and —C≡N;

$R_4$ and $R_5$ each represents a member selected from the group consisting of hydrogen, alkyl and a chemical bond in a pyridine ring;

$R_6$ and $R_7$ each represents a member selected from the group consisting of hydrogen, alkyl, aralkyl and a chemical bond of the same pyridine rings as $R_4$ and $R_5$;

$R_8$ represents alkyl;

$R_9$ represents a member selected from the group consisting of hydrogen, alkyl, aryl and a chemical bond in the same pyridine ring as $R_4$;

$R_{10}$ and $R_{11}$ each represents a member selected from the group consisting of hydrogen, alkyl, and aralkyl;

$R_{12}$ and $R_{13}$ each represents a member selected from the group consisting of alkyl, aralkyl, aryl, and a bond in the same heterocyclic ring;

J represents the non-metallic atoms necessary to complete a pyrrole nucleus;

L represents a methine group

X represents a monovalent acid radical

Z and $Z_1$ each represent the non-metallic atoms selected from the group consisting of O, C, S, Se and N necessary to complete a heterocyclic nucleus containing from 5 to 6 atoms in the heterocyclic ring;

$Z_2$ and $Z_3$ each represents the non-metallic atoms necessary to complete a nucleus selected from the group consisting of pyrrole, indole and pyrrocoline;

$a$, $b$, $d$, $m$ and $n$ each represents a positive integer selected from the group consisting of 1 and 2;

$c$ represents a positive integer selected from the group consisting of 1, 2, 3 and 4;

$e$ represents a positive integer selected from the group consisting of 2 and 3;

$p$ represents a positive integer selected from the group consisting of 1, 2 and 3; and $f$ represents a positive integer selected from the group consisting of 2, 3 and 4.

3. A photosensitive composition according to claim 1 wherein the cyanine dye is selected from the group consisting of cyanines represented by the general formula:

$$R-N\overset{\phantom{.}\phantom{.}\phantom{.}\phantom{.}Z\phantom{.}\phantom{.}\phantom{.}\phantom{.}}{---}(L=L)_{a-1}-\underset{R_3}{\overset{\phantom{.}}{C}}=\underset{R_1}{\overset{\phantom{.}}{C}}-(C=CH)_{b-1}-(CH=CH)_{c-2}-C\overset{\phantom{.}\phantom{.}\phantom{.}\phantom{.}Z_1\phantom{.}\phantom{.}\phantom{.}\phantom{.}}{=\!=\!=}(L---L)_{d-1}\overset{+}{=}N-R_2 \quad X^-$$

4. A photosensitive composition according to claim 1 wherein the cyanine dye is selected from the group consisting of symmetrical pyrrolocyanines represented by the general formula $$R_6-\overset{Z_2}{N}-C=\overset{\phantom{.}}{C}-(CH)_{2n-1}=\overset{Z_3}{C}-C=\overset{+}{N}-R_7 \quad X^-$$
$$\phantom{R_6-N-}R_4 \phantom{==(CH)_{2n-1}==}R_5$$

in which Z and Z′ each represents the nonmetallic atoms necessary to complete a pyrrole, indole, or pyrrocoline nucleus, and may be the same or different; R and R′ each represents hydrogen, alkyl or a chemical bond in a pyridine ring and may be the same or different; R″ and R‴ each represents hydrogen, alkyl, arylalkyl or a chemical bond of the same pyridine ring as R or R′ and may be the same or different; $n$ represents a positive integer of from 1 to 2; X represents an acid radical; and a photolytically active sensitizing agent which accelerates bleachout of said cyanine dye on exposure to light of a suitable wavelength, selected from the group consisting of alkyl, aryl and aralkyl compounds containing one or more halogen atoms selected from the group consisting of chlorine, bromine and iodine.

5. A photosensitive composition according to claim 1 wherein the cyanine dye is selected from the group consisting of unsymmetrical pyrrolocyanines represented by the general formula $$R_8-N-(CH=CH)_{n-1}-C=(CH-CH)_{e-1}=C-C=\overset{+}{N}-R_9 \quad X^-$$
$$\phantom{R_8-N-(CH=CH)_{n-1}-C=(CH-CH)_{e-1}=C-}R_4$$

in which Z represents the nonmetallic atoms necessary to complete a 5- or 6-membered heterocyclic nucleus; J represents the nonmetallic atoms necessary to complete a pyrrole nucleus; R represents hydrogen, alkyl or a chemical bond in a pyridine ring; R′ represents alkyl; R″ represents hydrogen, alkyl, aryl or a chemical bond of the same pyridine ring as R; $d$ represents a positive integer of from 2 to 3; $n$ represents a positive integer of from 1 to 2; X represents an acid radical; and a photolytically active sensitizing agent which accelerates bleachout of said cyanine dye on exposure to light of a suitable wavelength, selected from the group consisting of alkyl, aryl and aralkyl compounds containing one or more halogen atoms selected from the group consisting of chlorine, bromine and iodine.

6. A photosensitive composition according to claim 1 wherein the cyanine dye is selected from the group consisting of hemicyanines represented by the general formula $$R_{10}-\overset{\phantom{.}\phantom{.}\phantom{.}Z\phantom{.}\phantom{.}\phantom{.}}{N}\overset{+}{=}(L---L)_{n-1}=C-(CH=C)_{m-1}-(CH=CH)_{p-1}-\overset{R_{12}}{\underset{R_{13}}{N}}$$
$$X^- \phantom{====}R_{11}$$

in which R and R′ each represents members selected from the group consisting of hydrogen, alkyl and aralkyl groups and may be the same or different; R″ and R‴ each represents members selected from the group consisting of alkyl, aralkyl or aryl groups, or each may represent a bond in the same alicyclic or heterocyclic ring; $m$ represents a positive integer from 1 to 2; $n$ represents a positive integer from 1 to 2; $p$ represents a positive integer from 1 to 3; L represents a methine group; X represents an acid radical; Z represents the nonmetallic atoms necessary to complete a heterocyclic nucleus containing from 5 to 6 atoms in the heterocyclic ring; and a photolytically active sensitizing agent which accelerates bleachout of said cyanine dye on exposure to light of a suitable wavelength, selected from the group consisting of alkyl, aryl and aralkyl compounds containing one or more halogen atoms selected from the group consisting of chlorine, bromine and iodine.

7. A photosensitive composition according to claim 1 wherein the cyanine dye is selected from the group consisting of styryl dyes and vinylene homologs thereof $$R-\overset{+}{N}\overset{\phantom{.}\phantom{.}\phantom{.}Z\phantom{.}\phantom{.}\phantom{.}}{=\!=\!=}(CH-CH)_{n-1}=\!=\!=C-(CH=CH)_{f-1}-\underset{\phantom{.}}{\bigcirc}-\overset{R_1}{\underset{R_2}{N}}$$
$$X^-$$

where Z represents the nonmetallic atoms necessary to complete a heterocyclic nucleus containing from 5 to 6 atoms in a heterocyclic ring; $n$ represents a positive integer of from 1 to 2; R, R′, and R″ each represents a member selected from the group consisting of alkyl or aralkyl groups; $f$ represents a positive integer from 2 to 4; X represents an acid radical; and a photolytically active sensitizing agent which accelerates bleachout of said cyanine dye on exposure to light of a suitable wavelength, selected from the group consisting of alkyl, aryl and aralkyl compounds containing one or more halogen atoms selected from the group consisting of chlorine, bromine and iodine.

8. The composition of claim 1 wherein the ratio of sensitizing agent to dye is between about 1 to 80,000 parts by weight of sensitizer for each part by weight of dye.

9. The composition of claim 1 wherein the sensitizing agent is carbon tetrabromide.

10. The composition of claim 1 wherein the sensitizing agent is pentabromoethane.

11. The composition of claim 1 wherein the sensitizing agent is hexabromoethane.

12. A self-sustaining film comprising the composition of claim 1 in a film-forming plastic carrier material.

13. A photosensitive article comprising at least one layer composed of the composition of claim 1 supported on a base.

14. The article of claim 13 wherein the base is paper.

15. The article of claim 13 wherein the base is translucent.

16. An article of manufacture comprising a plurality of layers, each of which is formulated of a composition according to claim 1 and in which each layer contains a dye sensitive to light of a different wavelength than the wavelength to which the dye in any other layer is sensitive.

17. The article of claim 13 wherein said layer contains a plurality of said dyes to be bleached out.

18. A photographic process consisting of preparing a layer containing the composition of claim 1, exposing the layer to light of a suitable wavelength to produce an image therein by bleach-out of the cyanine dye, and heating said image-bearing layer to fix the image therein and to destroy the photosensitivity of the layer.

19. A direct positive photographic process which comprises preparing a composition consisting of a mixture of cyanine dyes and a sensitizing agent for accelerating the bleach-out of said dyes, said sensitizing agent being a normally solid organic halogen-containing compound which accelerates the bleaching out of said cyanine dye upon exposure, the organic compound being one having at least three halogen atoms on a single carbon atom, and represented by the general formula $A-C-X_3$ wherein A represents a member selected from the group consisting of H, Br, Cl, I, alkyl and aryl, and each X represents a halogen selected from the group consisting of Cl, Br and I; the organic halogen compound being present in said composition from about equal parts by weight of organic halogen compound and cyanine dye up to 10,000 parts by weight of organic halogen compound for each part by weight of cyanine dye; dispersing said composition in a photochemically inert carrier; coating the dispersion on a substrate; and exposing the coating to light of a suitable color, thereby obtaining a direct positive image.

References Cited in the file of this patent

UNITED STATES PATENTS

| | | |
|---|---|---|
| 1,804,674 | Clarke | May 12, 1931 |
| 1,926,643 | Bialon | Sept. 12, 1933 |
| 2,054,390 | Rust | Sept. 15, 1936 |
| 2,213,745 | Schinzel et al. | Sept. 3, 1940 |
| 2,238,231 | Riester et al. | Apr. 15, 1941 |
| 2,465,412 | Wilson | Mar. 29, 1949 |

FOREIGN PATENTS

| | | |
|---|---|---|
| 209,993 | Germany | Sept. 20, 1907 |
| 323,384 | Italy | Dec. 19, 1934 |
| 201,416 | Australia | Apr. 13, 1956 |

UNITED STATES PATENT OFFICE
CERTIFICATE OF CORRECTION

Patent No. 3,104,973                                September 24, 1963

Robert H. Sprague et al.

It is hereby certified that error appears in the above numbered patent requiring correction and that the said Letters Patent should read as corrected below.

In the drawings, line 2, in the title, for "CYAINE" read -- CYANINE --; column 5, lines 40 to 43, right-hand portion of the formula, for "Z" read -- Z' --; column 6, line 71, for "nonmetalilc" read -- nonmetallic --; column 7, lines 11 to 14, for that portion of the formula reading $$-(CH-CH)_{d-1}- \quad \text{read} \quad -(CH=CH)_{d-1}-$$

column 10, line 25, strike out "We claim:"; column 11, lines 37 to 41, for that portion of the formula reading $$-(CH=CH)_{c-2} \quad \text{read} \quad -(CH=CH)_{c-1}$$

line 51, beginning with "in which Z and Z' " strike out all to and including "bromine and iodine." in line 65, same column 11; same column 11, line 74, beginning with "in which Z" strike out all to and including "bromine and iodine" in line 13, column 12; same column 12, line 22, beginning with "in which R and R' " strike out all to and including "and iodine" in line 45, same column 12; same column 12, line 53, beginning with "where Z" strike out all to and including "bromine and iodine" in line 64, same column 12; column 11, line 34, 43, and 66, and column 12, lines 14 and 46, for "claim 1", each occurrence, read -- claim 2 --.

Signed and sealed this 2nd day of June 1964.

(SEAL)
Attest:

ERNEST W. SWIDER                                EDWARD J. BRENNER
Attesting Officer                                Commissioner of Patents